US012560010B2

(12) United States Patent
Vos et al.

(10) Patent No.: US 12,560,010 B2
(45) Date of Patent: Feb. 24, 2026

(54) PIVOT HINGE, PIVOTAL DOOR LEAF AND METHOD OF INSTALLING AND/OR REMOVING A PIVOTAL DOOR

(71) Applicant: FRITSJURGENS HOLDING B.V., Kolham (NL)

(72) Inventors: Robin Thom Vos, Kolham (NL); Arjan Christiaan Radersma, Kolham (NL)

(73) Assignee: FRITSJURGENS HOLDING B.V., Kolham (NL)

( * ) Notice: Subject to any disclaimer, the term of this patent is extended or adjusted under 35 U.S.C. 154(b) by 0 days.

(21) Appl. No.: 18/834,856

(22) PCT Filed: Feb. 7, 2023

(86) PCT No.: PCT/EP2023/052927
§ 371 (c)(1),
(2) Date: Jul. 31, 2024

(87) PCT Pub. No.: WO2023/148395
PCT Pub. Date: Aug. 10, 2023

(65) Prior Publication Data

US 2025/0116141 A1 Apr. 10, 2025

(30) Foreign Application Priority Data

Feb. 7, 2022 (EP) .................................... 22155447

(51) Int. Cl.

| | |
|---|---|
| ***E05D 7/10*** | (2006.01) |
| ***E05D 7/04*** | (2006.01) |
| ***E05D 7/081*** | (2006.01) |

(52) U.S. Cl.
CPC ........... *E05D 7/0423* (2013.01); *E05D 7/081* (2013.01); *E05Y 2201/626* (2013.01); *E05Y 2900/132* (2013.01)

(58) Field of Classification Search
CPC ....... E05D 7/04; E05D 7/0415; E05D 7/0423; E05D 7/043; E05D 7/08; E05D 7/081;
(Continued)

(56) References Cited

U.S. PATENT DOCUMENTS 1,479,413 A * 1/1924 Hedman ................. E05D 7/081 16/229
2,933,756 A * 4/1960 Muessel ................ E05D 7/1005 16/229
(Continued)

FOREIGN PATENT DOCUMENTS

CH 331159 A 7/1958
DE 199 01 513 A1 9/2000
(Continued)

OTHER PUBLICATIONS

International Search Report and Written Opinion for WO 2023/148395 (PCT/EP2023/052927), dated Jun. 1, 2023, pp. 1-11.
EP Search Report for 22155447.0, dated Jun. 29, 2022, pp. 1-2.

*Primary Examiner* — Chuck Y Mah
(74) *Attorney, Agent, or Firm* — Thomas|Horstemeyer, LLP

(57) ABSTRACT

Pivot hinge having an extendable and retractable pivot pin for pivotally connecting a pivotal door leaf with a structural element. The door leaf having an upper edge, lower edge, an inner side edge and an outer side edge. The pivot pin defining a vertical pivot axis. The pivot hinge further comprises a casing configured to be mounted to either the door leaf or the structural element, for example at the upper edge of the door leaf, e.g. at a corner region between the inner side edge and the upper edge of the door leaf, wherein the pivot pin is movably provided in a vertical passage within the casing, and a lever assembly adapted to move the pivot pin between a retracted position and an extended position. The lever assembly is located within the casing and comprises a
(Continued)

Figure 1A:
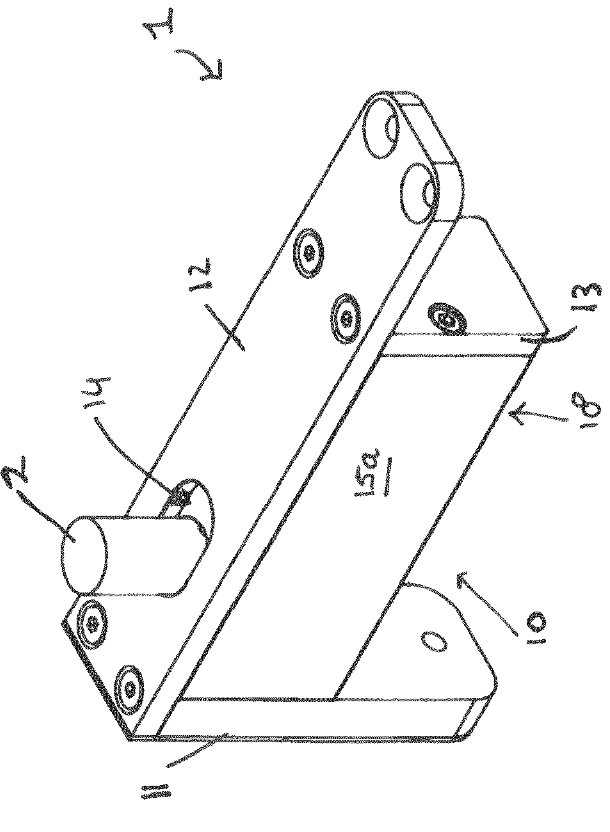

lever member having a first end engaging the pivot pin, a fulcrum, and a second end, and a lever adjustment member and being in engagement with the second end of the lever such that operating the lever adjustment member causes the lever to pivot about the fulcrum, which in turn causes movement of the pivot pin between the retracted and extended positions.

14 Claims, 11 Drawing Sheets

(58) Field of Classification Search
CPC ............ E05D 7/082; E05D 2007/0453; E05D 2007/0469; E05Y 2201/626; E05Y 2900/132
See application file for complete search history.

(56) References Cited

U.S. PATENT DOCUMENTS

| | | | | | |
|---|---|---|---|---|---|
| 2,955,314 | A * | 10/1960 | Tylman | E05D 7/081 16/229 |
| 3,114,942 | A * | 12/1963 | Abedon | E05D 7/1005 16/240 |
| 3,325,942 | A * | 6/1967 | Bejarano | E05D 7/081 16/245 |
| 3,964,207 | A * | 6/1976 | Peterson | E05D 7/081 49/167 |
| 4,646,472 | A * | 3/1987 | Sugawara | E05F 1/123 16/75 |
| 5,970,660 | A * | 10/1999 | Jacobs | E05D 7/0415 16/245 |
| 2013/0283566 | A1* | 10/2013 | Wach | E05F 1/123 16/245 |
| 2020/0011103 | A1* | 1/2020 | Sakuma | E05D 5/14 |

FOREIGN PATENT DOCUMENTS

| | | | | |
|---|---|---|---|---|
| GB | 404854 | A * | 1/1934 | E05D 7/081 |
| GB | 832978 | A * | 4/1960 | E05D 7/081 |
| JP | S48106136 | U | 12/1973 | |
| JP | S62196880 | U | 12/1987 | |
| JP | H0552160 | U | 7/1993 | |
| JP | 2550944 | Y2 * | 10/1997 | |
| JP | H10 246057 | A | 9/1998 | |
| JP | H11267239 | A | 10/1999 | |
| JP | 2000192719 | A * | 7/2000 | |
| JP | 2003193733 | A * | 7/2003 | |
| JP | 3842662 | B2 * | 11/2006 | |
| JP | 2009062693 | A * | 3/2009 | |
| JP | 2014101735 | A * | 6/2014 | |
| KR | 101531750 | B1 * | 6/2015 | E05D 7/1005 |

* cited by examiner

PIVOT HINGE, PIVOTAL DOOR LEAF AND METHOD OF INSTALLING AND/OR REMOVING A PIVOTAL DOOR

CROSS-REFERENCE TO RELATED APPLICATIONS

This application is the National Stage of International Application No. PCT/EP2023/052927, filed Feb. 7, 2023, which claims priority to EP 22155447.0, filed Feb. 7, 2022, all of which are entirely incorporated herein by reference.

The invention relates to the field of pivot hinges having an extendable and retractable pivot pin for pivotally connecting a pivotal door leaf with a structural element, e.g. a door frame, a floor, or a ceiling.

In known embodiments, a pivot hinges is mounted to a pivot door and comprises an extendable and retractable pin, often cylindrical in shape. To install the pivot door the pin is extended so as to be received in a suitable opening in the structural element, e.g. a door frame, a ceiling, or a floor. This opening in which the pivot pin is received could, for example, be provided in the structural element itself, or in a dedicated mounting plate that is to be fixed to the structural element. Alternatively, the pivot hinge is mounted to the structural element. To install the pivot door the pin is then extended and is received in a suitable opening in the pivot door.

The pivot pin and the opening in which it is received as the pin is extended typically engage such that the pivot door has a fixed position relative to the structural element, apart from rotation around a vertical pivot axis as defined by the pivot pin. In other words, by using a pivot hinge the pivot door can rotate around the vertical pivot axis defined by the pivot pin and as such can swing between open and closed positions, e.g. allowing for opening of the door in two directions.

In U.S. Pat. No. 2,657,421 a pivot hinge is disclosed in the corner region between the upper edge and the inner edge of the door leaf. Herein the pin can be caused to move between a retracted and projecting position by operating a rotary shank which runs in a rack that is formed on the pin intermediate its ends. This pivot pin cannot be adjusted laterally.

In U.S. Pat. No. 5,490,305 a pivot hinge is disclosed in the corner region between the upper edge and the inner edge of the door leaf. The pin can move to an extended position from the upper edge of the door by means of a spring. This means that when installing the door the pin has to be actively pushed down prior to its alignment with the opening in the door frame. This pivot pin cannot be adjusted laterally.

It is an object of the invention to provide an alternative pivot hinge. It is a further object of the invention to provide a pivot hinge that allows for improved installation and/or removal of a pivotal door leaf.

This object is achieved by a pivot hinge according to claim 1.

The casing is configured to be mounted to either the door leaf or the structural element, for example at the upper edge of the door leaf, e.g. at a corner region between the inner side edge and the upper edge of the door leaf.

A slidable base member is movably mounted within the casing such that sliding of the base member adjusts a lateral position of the pivot pin relative to the door leaf or the structural element. The slidable base member includes a block which defines a vertical passage therein and has sliding faces that are in sliding engagement with the casing. The pivot pin is movably provided in the vertical passage of the block.

A base adjustment member of the pivot hinge is configured such that operating the base adjustment member causes the slidable base member to move in the casing, e.g. in a direction parallel to the upper edge of the door leaf, e.g. parallel to a top plate of the casing.

The pivot hinge further comprises a lever assembly which is adapted to move the pivot pin between a retracted position and an extended position. The lever assembly is located within the casing and is supported by the slidable base member. The lever assembly comprises:

- a lever member having a first end engaging the pivot pin, a fulcrum, and a second end,
- a lever adjustment member being in engagement with the second end of the lever such that operating the lever adjustment member causes the lever to pivot about the fulcrum, which in turn causes movement of the pivot pin between the retracted and extended positions.

In the pivot hinge the lever assembly allows for a reliable mechanism for extension and retraction of the pivot pin.

The slidable base member allows for different lateral positions of the block having the vertical passage, the pivot pin arranged in this vertical passage, and of the lever assembly within the casing. This is advantageous when installing a door leaf as the alignment of the door leaf with respect to the structural element, e.g. door frame, floor, ceiling, and/or the alignment of the pivot pin with respect to an opening in said structural element may be adjusted.

The pivot pin is movably provided in the vertical passage in the block of the slidable base assembly, which base assembly is slidable within the casing. Also the lever assembly is located within the casing. This leads to a robust and integrated pivot hinge. The block may add stability and stiffness to the pivot pin.

In practical embodiments, the lever adjustment member is operable from outside the casing. For example, the lever adjustment member may be operable from an edge of the door leaf or the structural element it is mounted to, e.g. the inner side edge of the door leaf, the upper side edge of the door leaf, or an edge of a door frame. In this way easy access to the mechanism is provided when installing and/or removing such a door leaf.

Operating the base adjustment member causes the slidable base member to move within the casing, e.g. in a direction parallel to the upper edge. This is advantageous as then the distance between the inner side edge and the pivot pin can easily be adjusted. In other words, this facilitates ease of adjustment of the lateral position of the pivot pin. The operation of the base adjustment member is independent of operation of the lever adjustment member. That is, adjusting the extension of the pivot pin position through the lever adjustment member does not affect adjusting the lateral position of the slidable base member through the base adjustment member, or vice versa.

In an embodiment, the block of the slidable base member is slidably received with a portion thereof in an elongated recess in the bottom side of a top plate of the casing.

The block of the slidable base member can be made of a low friction material, e.g. of plastic. This leads to low friction for the movement of the pivot pin between the extended and retracted positions (i.e. the up and down movement), and simultaneously to a low friction for the movement of the slidable base member along the casing. In another embodiment, a low friction coating is present or a lubricant.

In a practical embodiment, the casing is provided with inner ribs to slidably support the block of the slidable base member. For example, longitudinal side plates of the casing are each provided with an inner rib.

In a practical embodiment, the base adjustment member is operable from the inner side edge of the door leaf. For example, the casing is configured to be mounted to the upper edge of the door leaf at a corner region between the inner side edge and the upper edge of the door leaf. This embodiment makes it easy for an installer to access the base adjustment member.

In a practical embodiment, the lever adjustment member is operable from the inner side edge, and the lever member is located on an opposite side of the pivot pin relative to the lever adjustment member. This is advantageous, e.g. as it allows for the vertical pivot axis to be located relatively close to the inner edge of door, whilst still being able to provide sufficient leverage by suitable dimensioning of the lever member. That is, the distance between the inner side edge of the door and the pivot axis does not rely on the size of the lever member. For example, the casing is configured to be mounted to the upper edge of the door leaf at a corner region between the inner side edge and the upper edge of the door leaf.

In a preferred embodiment, both the base adjustment member and the lever adjustment member are each operable from the inner side edge. For example, the casing is configured to be mounted to the upper edge of the door leaf at a corner region between the inner side edge and the upper edge of the door leaf.

In an embodiment, the base adjustment member comprises a fastener, e.g. a threaded fastener, which is operable through an opening in an inner side plate of the casing, so that rotation of the fastener in one direction pushes the block of the slidable base member away from the inner side and in the other direction pulls the block of the slidable base member towards the inner side edge.

In an embodiment, the lever adjustment member comprises a connecting block with which the second end of the lever member is coupled, wherein a linear movement of the connecting block in a direction parallel to a top plate of the casing leads to a rotation of the lever member about the fulcrum, which in turn leads to a linear movement of the pivot pin in the vertical direction. Herein the lever adjustment member comprises a fastener that is operable through an opening in an inner side plate of the casing, so that a rotation of the fastener in one direction pushes the connecting block away from the inner side edge and in the other direction pulls the connecting block towards the inner side edge.

In an embodiment, the casing is configured to be mounted with a top plate thereof along the upper edge of the door leaf or along a corresponding edge of the structural element, e.g. in a door frame above the upper edge of the door leaf. Herein the top plate has an elongated opening through which the pivot pin passes. Both the base adjustment member and the lever adjustment member are each operable from the top plate of the casing, at opposite sides relative to the opening for the pivot pin. Due to the overall structure of this embodiment, with the lever member and the associated lever adjustment member being located on one side of the pivot pin and with the base adjustment member on the other side, a relatively compact and sturdy pivot hinge can be obtained. For example, this pivot hinge can be mounted further towards and/or in the middle of the pivotal door leaf, so not in the corner region as discussed herein with reference to other embodiments.

In an embodiment, the lever adjustment member comprises a fastener that is rotatably mounted in the slidable base member, perpendicular to the top plate of the casing, which fastener is operable from the top plate of the casing and is coupled with the second end of the lever member via a nut member that is movable up and down by rotation of the fastener causing the lever member to pivot about the fulcrum.

In an embodiment, the base adjustment member comprises an adjustment shaft that is rotatably mounted in the casing, perpendicular to the top plate of the casing, which adjustment shaft is operable from the top plate of the casing. Herein the base adjustment member further comprises a rotatable drive shaft parallel to the top plate of the casing, which drive shaft is journalled in the casing and has an end connected to the adjustment shaft via a gear transmission of the base adjustment member, e.g. a bevel gears transmission. The drive shaft has an opposed end threadingly connected to the block of the slidable base assembly so that rotation of the adjustment shaft causes adjustment of the lateral position of the block and the pivot pin.

In a practical embodiment, the gear transmission is a bevel gears transmission.

In a practical embodiment, the adjustment shaft has a head end journalled in the top plate, e.g. the head end being provided with a hex socket.

In a practical embodiment, the casing comprises an inner side plate, a top plate having an opening through which the pivot pin passes, and an outer side plate.

For example, in an embodiment of the pivot hinge to be mounted in the corner region of the door leaf, the inner side plate is configured to be mounted flush with the inner edge of the door leaf and the top plate flush with the upper edge of the door leaf. As discussed, preferably herein both the base adjustment member and the lever adjustment member are each operable from the inner side edge.

Preferably, the casing also comprises longitudinal side plates extending between the inner and outer side plates, and a bottom plate, wherein the longitudinal side plates are each provided with an inner rib to slidably support the block of the slidable base member, e.g. the block being made of plastic.

The invention further relates to a pivotal door leaf provided with a pivot hinge according to the invention. The pivotal door leaf can rotate around the vertical pivot axis and as such can swing between open and closed positions, for example in two directions.

In an embodiment the pivot hinge is mounted to the upper edge of the door leaf, e.g. in corner region between the inner side edge and the upper edge of the pivotal door leaf.

The present invention also relates to a pivot hinge, wherein the casing is configured to be mounted to the upper edge of the door leaf at a corner region between the inner side edge and the upper edge of the door leaf, and wherein both the base adjustment member and the lever adjustment member are each operable from the inner side edge.

The present invention also relates to a pivot hinge, wherein the casing is configured to be mounted with a top plate thereof along the upper edge of the door leaf or along a corresponding edge of the structural element, e.g. in a door frame above the upper edge of the door leaf, wherein the top plate has an elongated opening through which the pivot pin passes, and wherein both the base adjustment member and the lever adjustment member are each operable from the top plate of the casing, at opposite sides relative to the opening for the pivot pin.

A second aspect of the present invention relates to a pivot hinge having an extendable and retractable pivot pin for pivotally connecting a pivotal door leaf with a structural element, the door leaf having an upper edge, lower edge, an inner side edge and an outer side edge, and the pivot pin defining a vertical pivot axis, wherein the pivot hinge further comprises:

- a casing configured to be mounted to either the door leaf or the structural element, for example at the upper edge of the door leaf, e.g. at a corner region between the inner side edge and the upper edge of the door leaf, wherein the pivot pin is movably provided in a vertical passage within the casing,
- a lever assembly adapted to move the pivot pin between a retracted position and an extended position, wherein the lever assembly is located within the casing, the lever assembly comprising:
- a lever member having a first end engaging the pivot pin, a fulcrum, and a second end,
- a lever adjustment member being in engagement with the second end of the lever such that operating the lever adjustment member causes the lever to pivot about the fulcrum, which in turn causes movement of the pivot pin between the retracted and extended positions.

In an embodiment of the second aspect, the lever member is located on an opposite side of the pivot pin relative to the lever adjustment member.

In an embodiment of the second aspect, the pivot hinge further comprising a slidable base member that is movably mounted in the casing, the slidable base member supporting the lever assembly, the vertical passage, and the pivot pin, such that sliding of the base member adjusts a lateral position of the pivot pin relative to the door leaf or the structural element. For example, the pivot hinge comprises a base adjustment member being configured such that operating the base adjustment member causes the slidable base member to move in the casing, e.g. in a direction parallel to the upper edge. For example, the casing is configured to be mounted to the door leaf, and wherein the base adjustment member is operable from the inner side edge.

In an embodiment of the second aspect, the slidable base member includes a block which defines the vertical passage therein and has sliding faces that are in sliding engagement with the casing.

In an embodiment of the second aspect, the casing is provided with inner ribs to slidably support the slidable base member, e.g. the block thereof.

The invention further relates to a structural element and a pivotal door leaf connected to the structural element via a pivot hinge as described herein, wherein the casing is mounted to either the door leaf or to the structural element, for example in a corner region of the door leaf or more towards the middle at the upper edge of the door leaf or in a door frame above the upper edge of the door leaf.

The invention further relates to a method of installing and/or removing a pivotal door leaf as described herein, wherein the method comprises the steps of:

- operating the lever adjustment member to move the pivot pin between the retracted and extended positions, and/or
- operating the base adjustment member adjusts a lateral position of the pivot pin relative to the door leaf or the structural element, e.g. a distance between the inner side edge and the pivot pin.

Figure 1B:
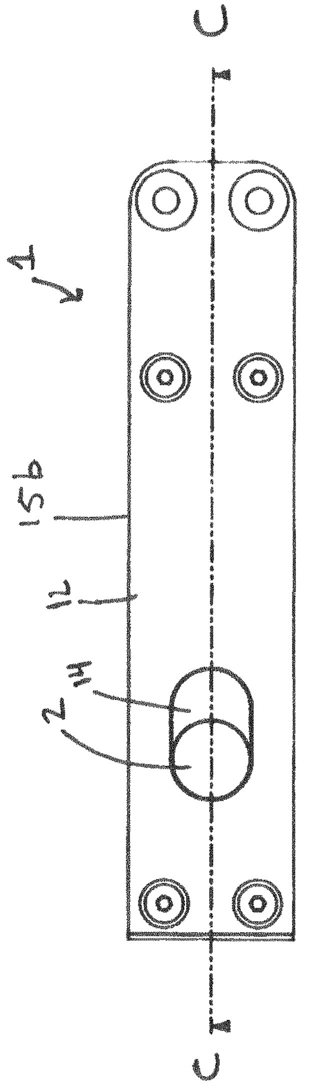
Figure 1C:
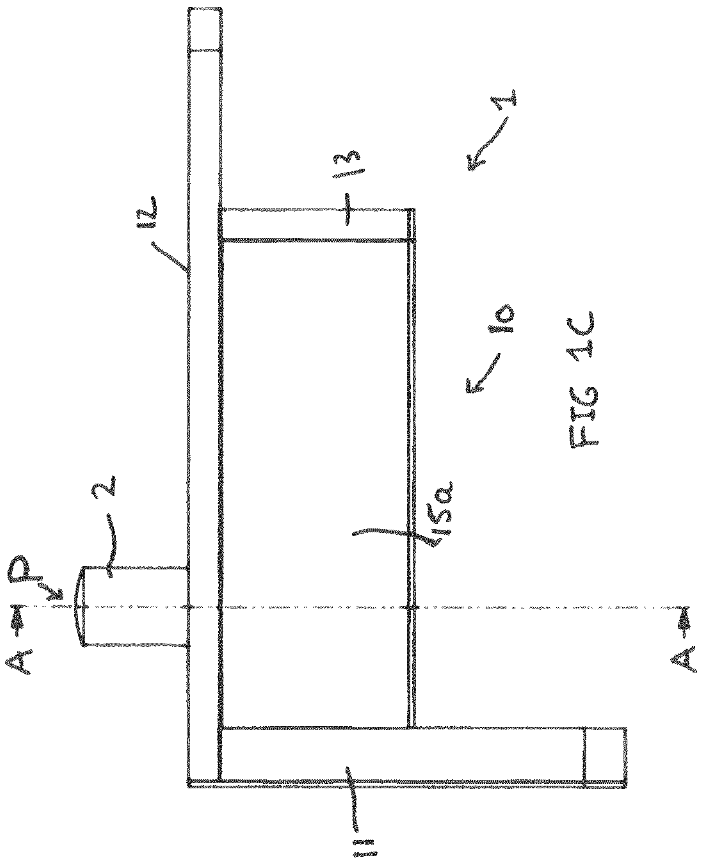
Figure 2:
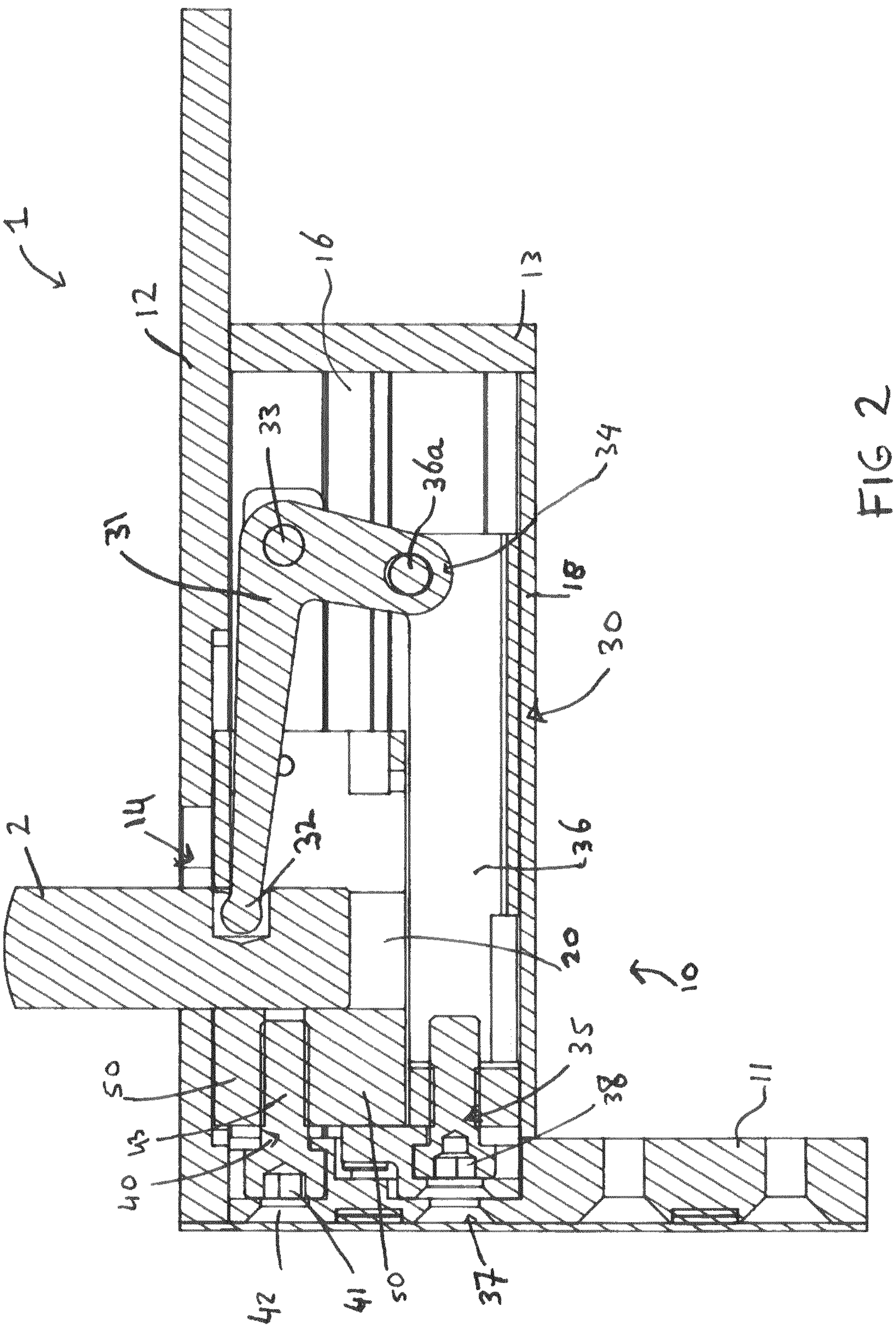
Figure 3:
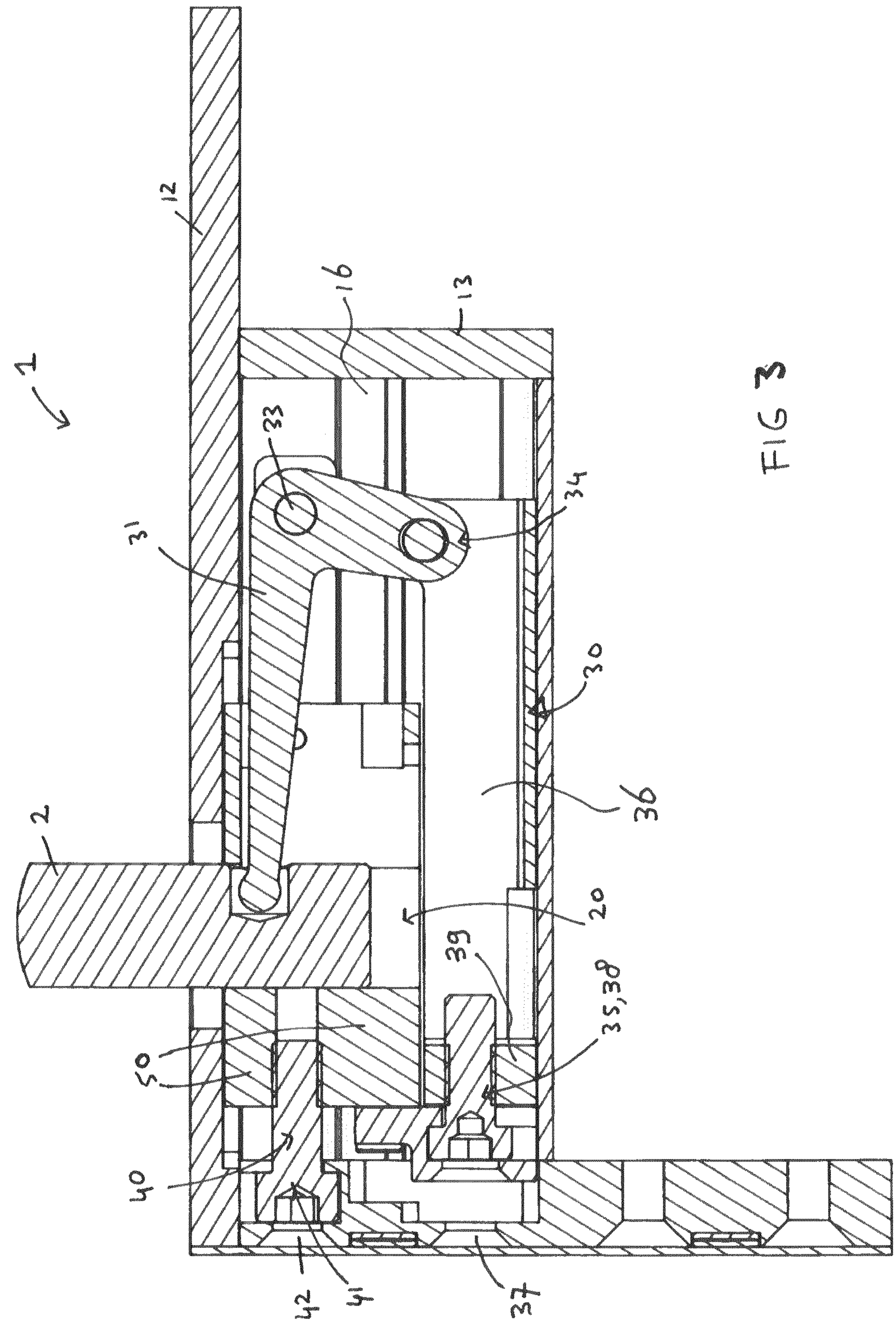
Figure 4:
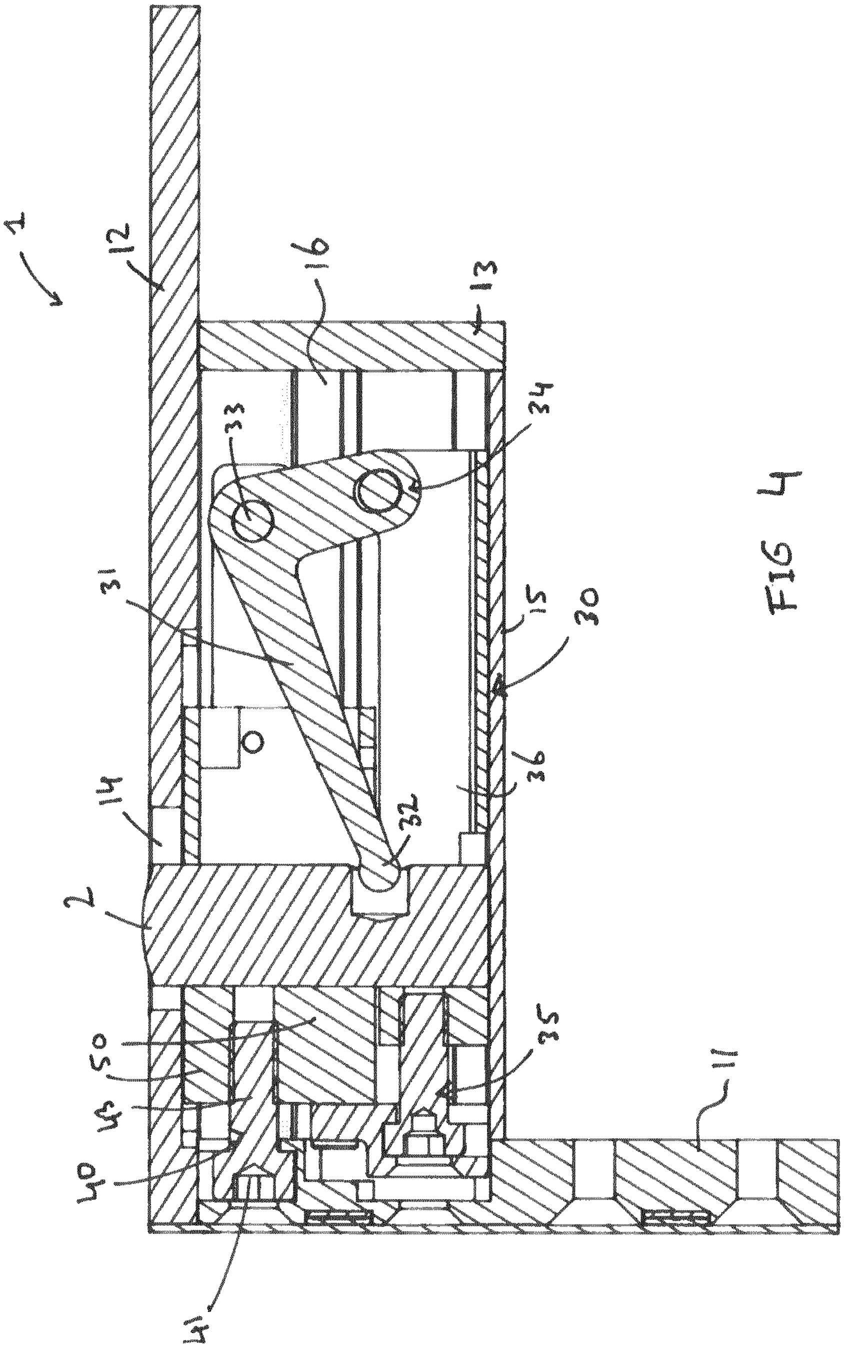
Figure 5:
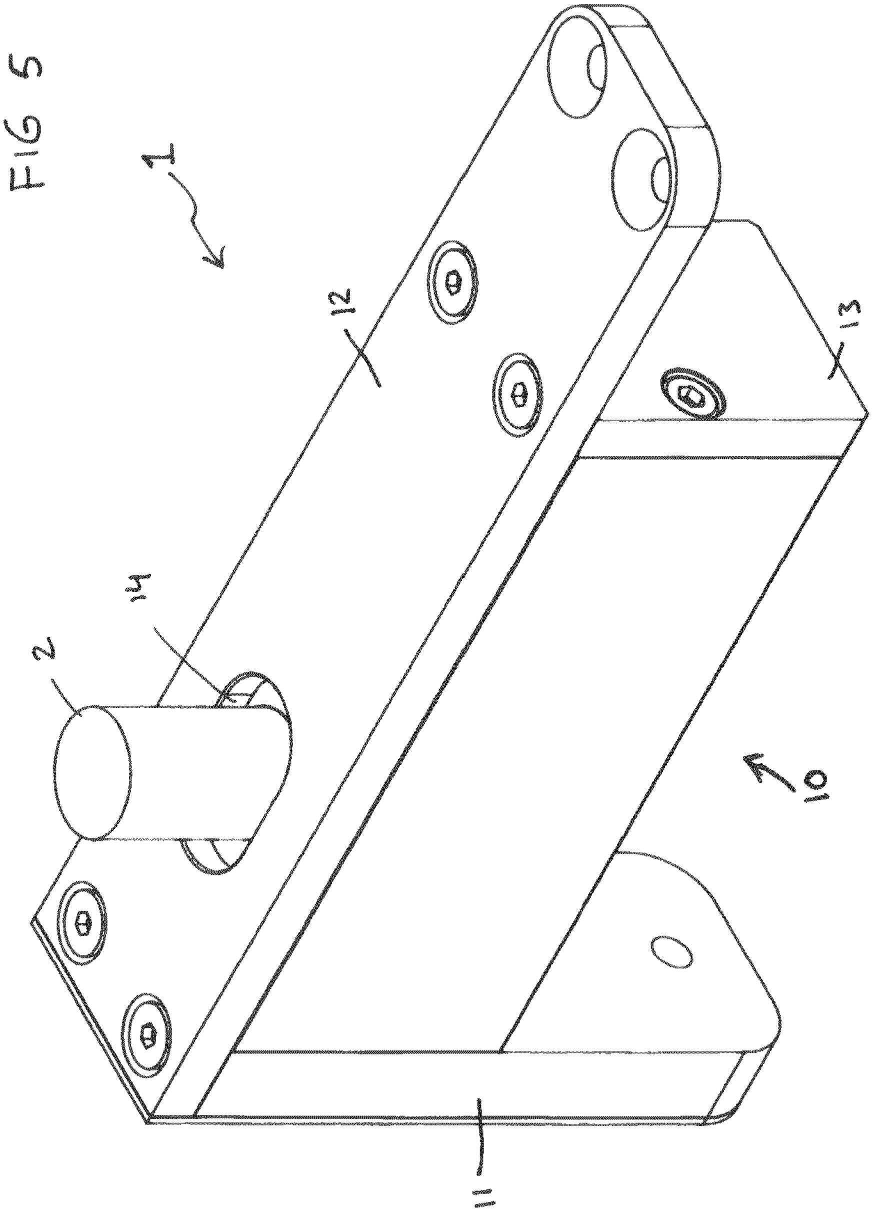
Figure 6:
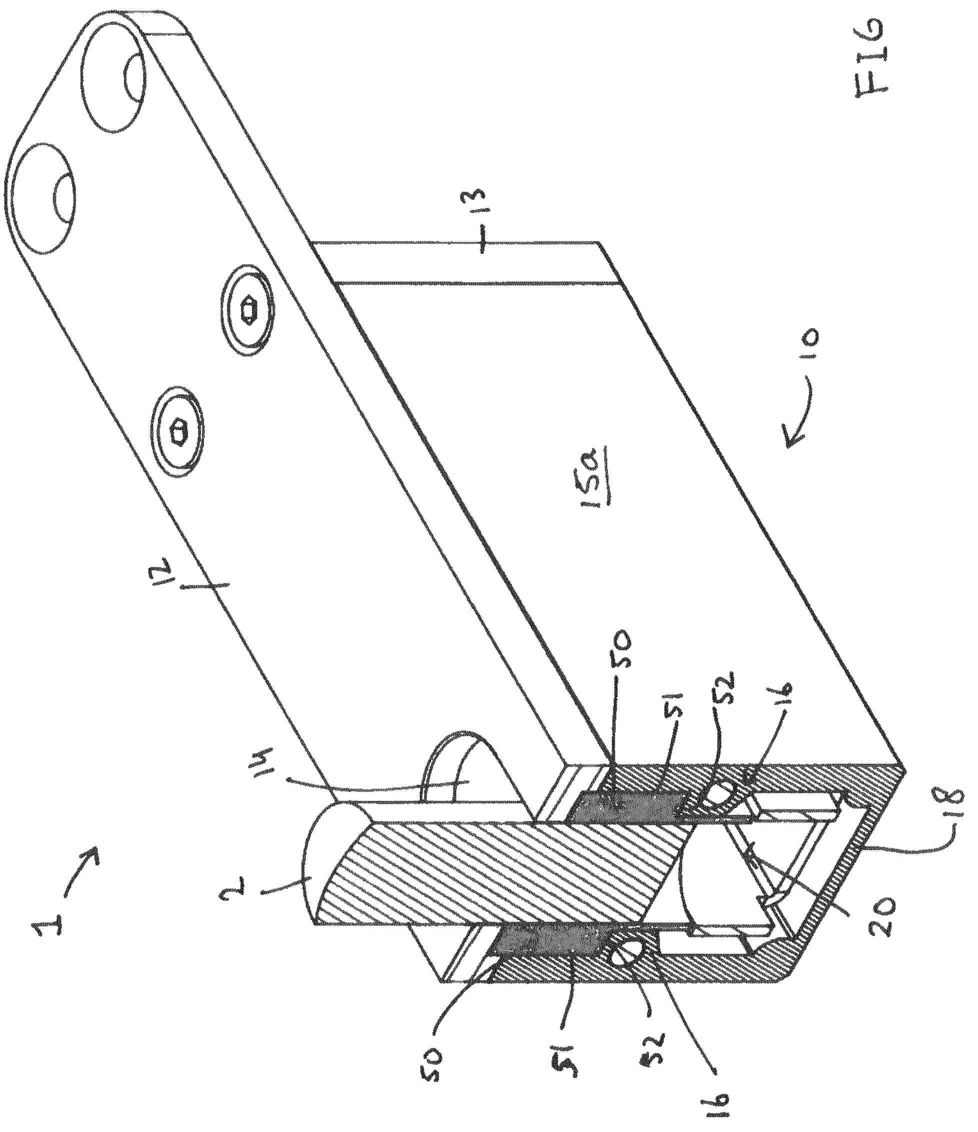
Figure 7:
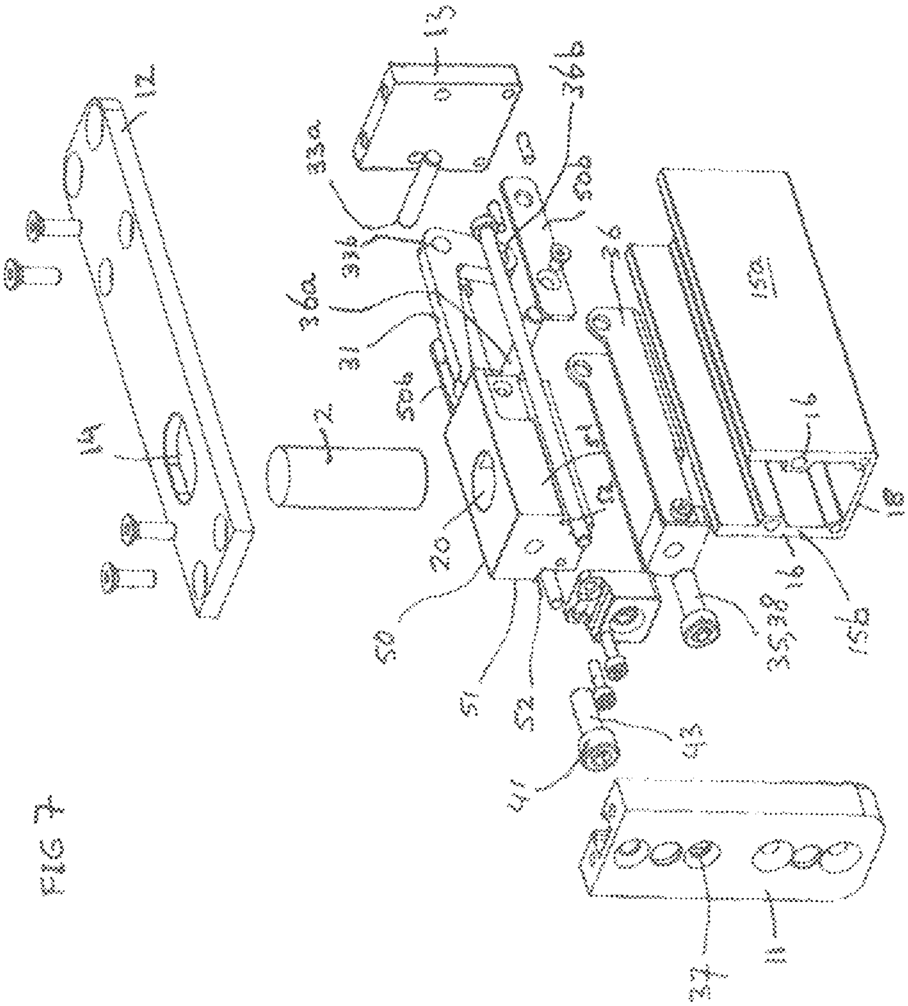
Figure 8:
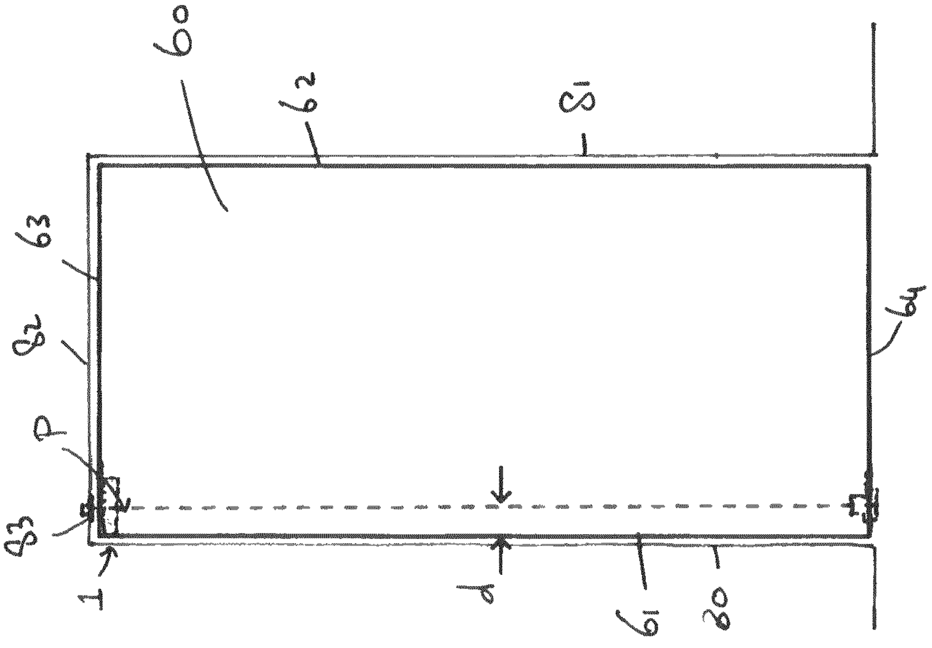
Figure 9A:
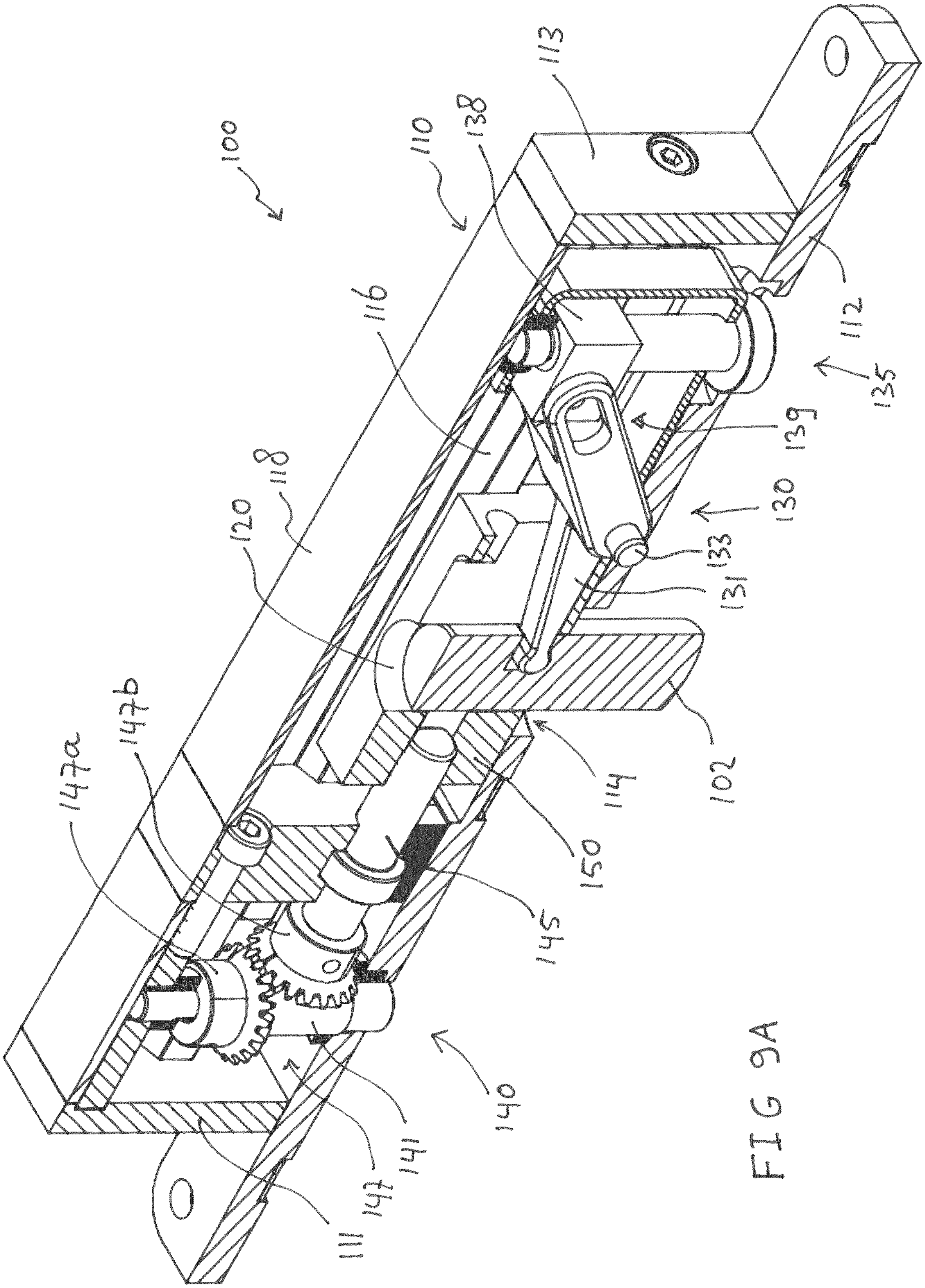
Figure 9B:
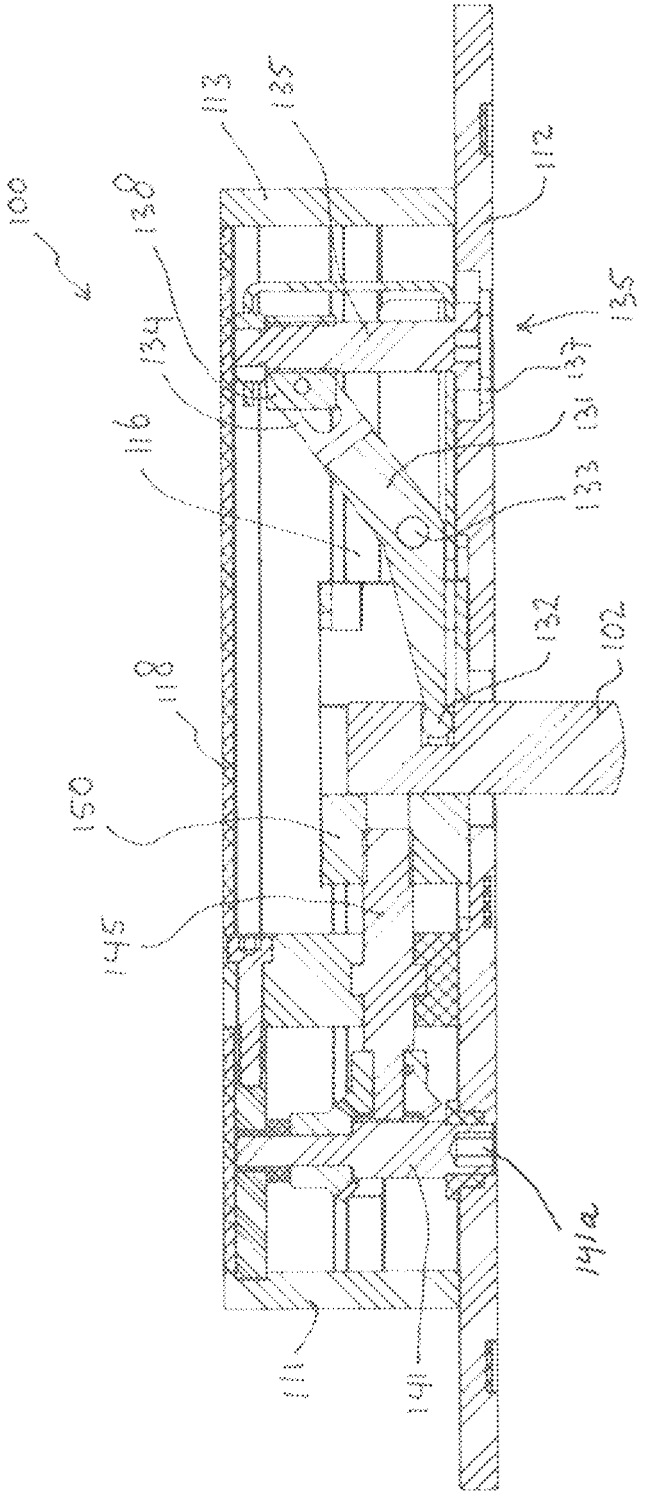
Figure 9C:
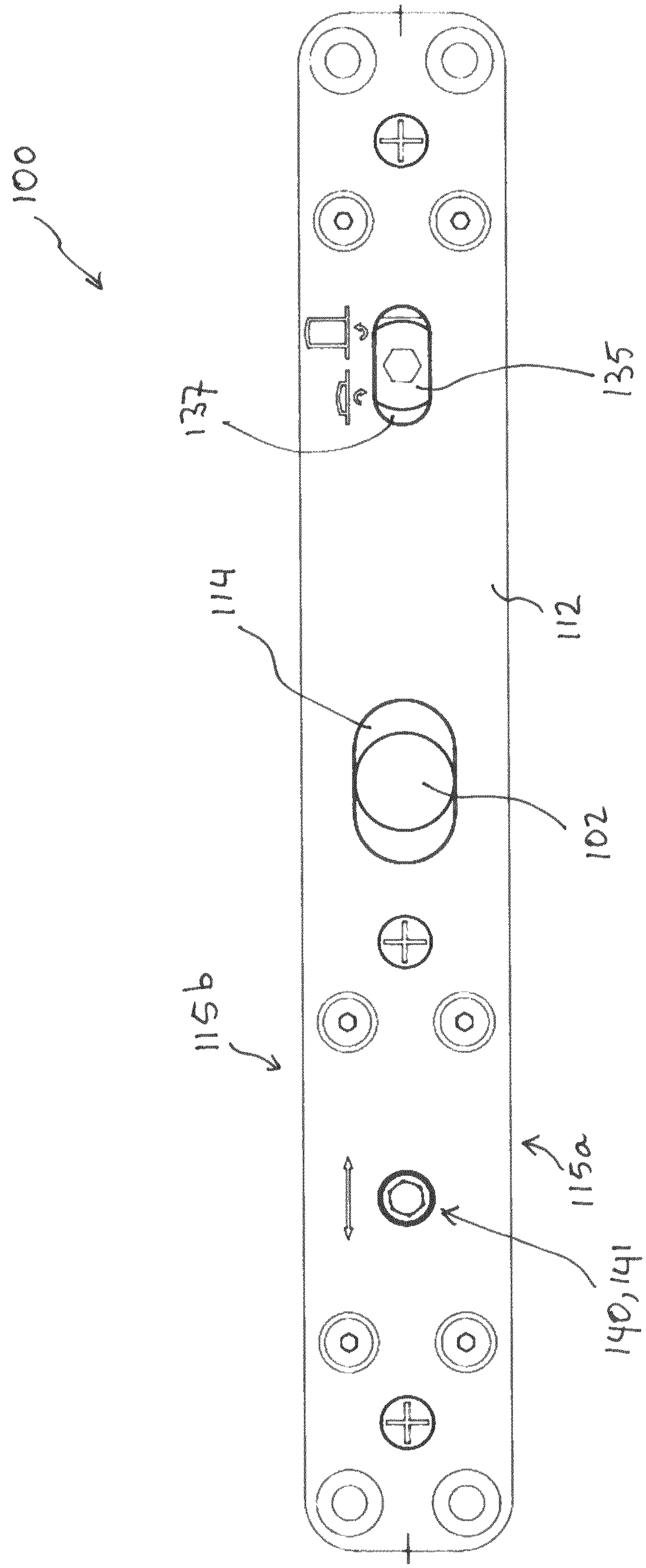

The invention will be explained further with reference to the drawings, in which like reference symbols designate like parts. In the drawings:

FIGS. 1A-1C schematically show a view in perspective, a top view, and a side view of a pivot hinge according to the invention in an extended state, FIG. 2 schematically shows a cross-section of the pivot hinge of FIGS. 1A-1C along C-C, in an extended state, FIG. 3 schematically shows a cross-section of the pivot hinge of FIGS. 1A-1C along C-C, in an extended and an adjusted state, FIG. 4 schematically shows a cross-section of the pivot hinge of FIGS. 1A-1C along C-C, in a retracted and an adjusted state, FIG. 5 schematically shows a view in perspective of a pivot hinge according to the invention in an adjusted state, FIG. 6 schematically shows a cross-section in perspective of the pivot hinge of FIGS. 1A-1C along A-A, FIG. 7 schematically shows an exploded view of a pivot hinge according to the invention, FIG. 8 schematically shows a pivotal door leaf provided with a pivot hinge according to the invention, FIGS. 9A-9C schematically show another embodiment of a pivot hinge according to the invention.

In FIGS. 1A-1C is shown a pivot hinge 1 having an extendable and retractable pivot pin 2 for pivotally connecting a pivotal door leaf with a structural element, the door leaf having an upper edge, lower edge, an inner side edge and an outer side edge, and the pivot pin 2 defining a vertical pivot axis P. It is noted that in FIG. 1C the vertical pivot axis P coincides with the line A-A.

The pivot hinge 1 is shown to further comprise a casing 10 configured to be mounted to either the door leaf or the structural element, for example at the upper edge of the door leaf, e.g. at a corner region between the inner side edge and the upper edge of the door leaf.

The casing 10 comprises an inner side plate 11, a top plate 12 and an outer side plate 13.

The casing 10 further comprises longitudinal side plates 15*a,b* extending between the inner and outer side plates 11, 13, and a bottom plate 18.

The longitudinal side plates 15*a, b* are each provided with an inner rib 16.

The top plate 12 has an opening 14 through which the extended pivot pin 2 may project. In this embodiment the opening 14 is of an elliptical shape, but other shapes are conceivable.

The pivot pin 2 is movably provided in a vertical passage 20 within the casing 10.

In FIG. 2 is shown that the pivot hinge 1 comprises a lever assembly 30.

The lever assembly 30 is located within the casing 10 and is adapted to move the pivot pin 2 between a retracted position (shown e.g. FIG. 4) and an extended position (shown e.g. in FIGS. 1A-1C, FIG. 2). In FIG. 2 the pivot pin 2 is in an extended position in which the pivot pin 2 projects outwardly from the casing 10, through the opening 14 in the top plate 12. In FIG. 4 the pivot pin 2 is in a retracted position in which the pivot pin 2 is located within the casing 10.

The lever assembly 30 has a lever member 31 having a first end 32 engaging the pivot pin 2, a fulcrum 33, and a second end 34. As shown in FIG. 7 the fulcrum 33 may be formed by a horizontal shaft 33*a* that extends through a hole 33*b* in the lever member 31. In the shown example, the shaft 33*a* is secured to the block 50 via plate members 50*b*.

The lever adjustment member 35 is operable from the inner side edge of the door leaf. It is positioned in or near the inner side plate 11 of the casing 10.

The lever adjustment member 35 is in engagement with the second end 34 of the lever member 31 such that operating the lever adjustment member 35 causes the lever member 31 to pivot about the fulcrum 33, which in turn causes movement of the pivot pin 2 between the retracted and extended positions.

In FIG. 2 it is shown that the lever adjustment member 35 comprises a connecting block 36 with which the second end 34 of the lever member 31 is coupled, here pivotally about a horizontal axis. A linear movement of the connecting block 36 in the direction parallel to the top plate 12 leads to a rotation of the lever member 31 about the fulcrum 33, which in turn leads to a linear movement of the pin 2 in the vertical direction.

As shown in FIG. 7, a shaft **36*a* is secured to the connecting block 36 at the end remote from the adjustment member 35. The shaft 36*a* extends through a hole 36*b* in the lever member 31**.

The lever member 31 is located on an opposite side of the pivot pin 2 relative to the lever adjustment member 35.

Adjustment member 35 comprises a fastener 38 that can be operated through an opening 37 in the inner side plate 11 of the casing 10. Rotation of the fastener 38 in one direction pushes the connecting block 36 towards the outer side edge and rotation in the other direction pulls the block 36 towards the inner side edge.

The fastener 38 extends perpendicular to the inner side plate 11 of the casing and is accessible for rotation of the fastener 38 via an opening 37 in the inner side plate 11.

The fastener 38 is embodied with a head of the fastener 38 being rotatably retained in a portion of the slidable base member, here a portion secured to the block 50, and with a threaded shank which extends from the head and which is screwed into a threaded nut portion 39 of the connecting block 36. As preferred, the head of the fastener 38 is provided with a hex socket.

The pivot hinge 1 further comprises a slidable base member that is movably mounted in the casing 10, the slidable base member supporting the lever assembly 30, the vertical passage 20 and the pivot pin 2, such that sliding of the base member adjusts a lateral position of the pivot pin relative to the door leaf or the structural element. For example, when the pivot hinge 1 is mounted to a door leaf, e.g. the corner region between the inner side edge and the upper edge of the door leaf, the slidable base member is movably mounted in the casing 10 such that it can slide in a direction parallel to the upper edge.

The pivot hinge 1 comprises a base adjustment member 40 being configured such that operating the base adjustment member 40 causes the slidable base member to move in the direction parallel to the upper edge of the door leaf, i.e. parallel to the top plate 12. The base adjustment member 40 is operable from the inner side edge of the door leaf as it is positioned in or near the inner side plate 11 of the casing 10.

The base adjustment member 40 comprises a fastener 41 that can be operated through opening 42 in the inner side plate 11 of the casing 10.

The fastener 41 is embodied with a head of the fastener which is rotatably retained in the side plate 11 of the casing. The fastener 41 has a threaded shank 43 which extends from the head and which is screwed into a threaded bore of the block 50. As preferred, the head of the fastener 41 is provided with a hex socket.

Rotation of the fastener 41 in one direction pushes the block 50 towards the outer side edge plate 13 and rotation in the other direction pulls the block 50 towards the inner side edge plate 11. In this manner, the distance between the inner side edge and the pivot pin 2 is adjusted. That is, depending on the rotation of fastener 41 the vertical passage 20, pivot pin 2 and lever assembly 30 move towards the inner side edge or towards the outer side edge. The latter can be seen in comparing FIGS. 3 and 5 to FIGS. 1A-C and 2.

When the fastener 41 is operated, also the fastener 35 is moved in longitudinal direction of the casing. Yet, the lever member 31 remains in its actual position until the fastener 38 is operated.

In FIG. 3 is shown a cross-section of the pivot hinge 1 of FIGS. 1A-1C along C-C.

In FIG. 5 is shown a view in perspective of a pivot hinge. In these FIGS. 3 and 5 the pivot pin 2 is in an extended state and projects from the top plate 12 through opening 14. The opening 14 is a slotted opening, allowing for all lateral positions of the pivot pin.

Furthermore, it can be seen in FIG. 3 that the vertical passage 20, pivot pin 2 and lever assembly 30 are located further towards the outer side edge relative to their position of FIG. 2. Similarly, in FIG. 5 the pivot pin 2 is located further towards the outer side edge. This adjusted state is achieved through the base adjustment member 40 being configured such that operating the base adjustment member 40 causes the slidable base member to move in the direction parallel to the upper edge of the door leaf.

In FIG. 6 is shown a cross-section in perspective of the pivot hinge 1 of FIGS. 1A-1C along the line A-A and in FIG. 7 is shown an exploded view of pivot hinge 1. It can be seen that the slidable base member includes the block 50, which is made of a low friction material, e.g. of plastic.

The block 50 defines the vertical passage 20 therein and has sliding faces 51, 52 that are in sliding engagement with the casing 10.

In FIGS. 6 and 7 is shown that the casing 10 is provided with inner ribs 16 to slidably support the slidable base member, here the block 50 thereof.

In more detail, the casing 10 has the longitudinal side plates which are each provided with an inner rib 16 to slidably support the block of the slidable base member.

As shown the block 50 is slidably received with a portion thereof in an elongated recess in a top plate 12 of the casing.

As shown in FIG. 7 the longitudinal side plates may be combined with a bottom plate of the casing in the form of a channel profile having an open top to be covered by the top plate and open ends to be closed by the inner side plate and the outer side plate respectively.

In FIG. 8 is shown a pivotal door leaf 60 provided with a pivot hinge 1. The door leaf 60 has an upper edge 63, lower edge 64, an inner side edge 61, and an outer side edge 62. The door leaf 60 is installed in an opening between walls 80, 81 and is pivotally connected to the ceiling 82 by means of pivot hinge 1.

The pivot hinge 1 is mounted to a corner region between the inner side edge 61 and the upper edge 63 of the pivotal door leaf. The pivot hinge 1 may be provided internally within the door leaf 60 and/or may form the outer contour of the door leaf 60 in said corner region. In case of a fully internal pivot hinge openings in the inner side edge 61 of the door may be provided to allow access to the lever adjustment member 35 and/or base adjustment member 40.

The pivot pin 2 defines the vertical pivot axis P and in the extended position projects into an opening in ceiling plate 83. The vertical pivot axis P is located at a distance d from the inner side edge. This distance can be adjusted by means of the base adjustment member 40. It is noted that in FIG. 8 the vertical pivot axis P is located relatively close to the inner edge 61 of the door leaf 60. It is conceivable that the vertical pivot axis P is located further towards and/or coinciding with a central axis of the door leaf 60.

A method of installing and/or removing a pivotal door leaf 60 comprises the steps of:

operating the lever adjustment member 35 to move the pivot pin 2 between the retracted and extended positions, and/or operating the base adjustment member 40 adjusts a lateral position of the pivot pin relative to the door leaf or the structural element, e.g. the distance d between the inner side edge and the pivot pin.

In FIGS. 9A-9C is shown another embodiment of a pivot hinge 100 according to the invention. This embodiment is not configured to be mounted with an inner side plate of the casing flush with the inner edge of the door leaf as in the embodiment of FIGS. 1-7. Instead, it is envisaged that the pivot hinge 100 has a casing that is configured to be mounted with a top plate 112 thereof along the upper edge of the door leaf or along a corresponding edge of the structural element, e.g. in a door frame above the upper edge of the door leaf. For example, the pivot axis is then located more towards the middle of the door leaf, so more remote from the inner edge of the door leaf than in the embodiment of FIGS. 1-7.

The embodiment of FIGS. 9A-D is in particular suited for mounting the casing to the structural element above the door leaf, e.g. in a door frame portion extending above the door leaf.

Mounting the pivot hinge 100 to the structural element instead of to the door leaf has an impact on the mechanical loads that have to be absorbed by the pivot hinge and the components thereof. In particular, when the pivot hinge is mounted to the door leaf the weight of the door leaf always acts in the same plane relative to the pivot hinge as the latter swings along with the door leaf. When the pivot hinge is mounted to the structural element this load of the door leaf onto the pivot hinge has a varying direction when the door is opened and closed, subjecting the components of the pivot hinge to increased mechanical fatigue loading. The design of the pivot hinges disclosed herein, in particular of pivot hinge 100, allows to absorb such loading.

The pivot hinge 100 comprises an extendable and retractable pivot pin 102, the pivot pin defining a vertical pivot axis.

The pivot hinge 100 further comprises a casing 110 which is configured to be mounted to either the door leaf or the structural element, for example at the upper edge of the door leaf or to the structural element above the door leaf.

The casing comprises an inner side plate 111, a top plate 112, an outer side plate 113, longitudinal side plates 115*a,b* extending between the inner and outer side plates 111, 113, and a bottom plate 118.

The longitudinal side plates 115*a, b* are each provided with an inner rib 116 to slidably support a block 150.

The block 150 is part of a slidable base member that is movably mounted within the casing 110 such that sliding of the base member including the block 150 adjusts a lateral position of the pivot pin 102 relative to the door leaf or the structural element.

The slidable base member includes the block 150 which defines a vertical passage 120 therein. The block 150 has sliding faces that are in sliding engagement with the casing, preferably with at least the longitudinal side plates 115*a,b* and the top plate 112 to provide stability of the block 150.

Preferably, the block 150 is made of plastic or of another low friction material.

The pivot pin 102 is vertically mobile in the vertical passage 120 of the block 150.

The pivot hinge 100 further comprises a base adjustment member 140 which is configured such that operating the base adjustment member causes the slidable base member including block 150 to move within the casing, in a direction parallel to top plate 112.

The pivot hinge 100 further comprises a lever assembly 130 which is adapted to move the pivot pin 102 between a retracted position and an extended position thereof. FIGS. 9A, 9B show the extended position.

The lever assembly 130 is located entirely within the casing 110 and is supported by the slidable base member.

The lever assembly 130 comprises:

a lever member 131 having a first end 132 engaging the pivot pin 102, a fulcrum 133 on the slidable base, and a second end 134, a lever adjustment member 135 being in engagement with the second end 134 of the lever member 131 such that operating the lever adjustment member 135 causes the lever member 131 to pivot about the fulcrum 133, which in turn causes movement of the pivot pin 102 between the retracted and extended positions.

As shown, the lever member 131 is located on the same side of the pivot pin 102 as the lever adjustment member 135.

The top plate 112 has a slotted opening 114 through which the pivot pin 102 passes in any set lateral position of the pivot pin 102.

It is shown that both the base adjustment member 140 and the lever adjustment member 135 are each operable from the top plate 112 of the casing, at opposite sides relative to the opening 114 for the pivot pin 102.

The lever adjustment member 135 comprises a fastener that is rotatably mounted in the slidable base member, perpendicular to the top plate 112 of the casing. This fastener 135 is operable from the top plate 112 of the casing and is coupled with the second end 134 of the lever member 131 via a nut member 138 that is movable up and down by rotation of the fastener 135 causing the lever member 131 to pivot about the fulcrum 133.

The fastener 135 has a head, here with a hex socket, and a threaded shank extending from the head. The shank extends through a threaded bore in the nut member 138. The head of the fastener is accessible via an opening 137 in the top plate 112, the opening 137 being elongated so that the head, e.g. the hex socket therein, is accessible for rotation of the fastener 135 in any lateral position of the slidable base assembly within the casing.

The nut member 138 connects to the second end 134 of the lever member 131 via a pin-in-slot connection 139.

The base adjustment member 140 comprises an adjustment shaft 141 that is rotatably mounted in the casing, perpendicular to the top plate 112 of the casing. The adjustment shaft is operable from the top plate 112 of the casing.

The pivot hinge 100 further comprises a rotatable drive shaft 145 which extends within the casing and parallel to the top plate 112 of the casing. The drive shaft 145 is journalled in the casing 110, so is rotatable about its axis yet not movable in axial direction thereof.

The drive shaft 145 has an outer end which is connected to the adjustment shaft 140 via a gear transmission 147, here via a bevel gears transmission with gears 147*a,b*. The drive shaft 145 has an opposed end which is threadingly connected to the block 150, here with a threaded shaft portion screwed into a threaded bore of the block, so that rotation of the adjustment shaft 140 causes adjustment of the lateral position of the block and the pivot pin.

As shown, the adjustment shaft 140 preferably has a head end 141*a* which is journalled in the top plate 112, e.g. the head end being provided with a hex socket.

Due to the provision of the base adjustment member 140 in cooperation with the drive shaft 145 and the gear transmission 147, the block 150 is reliably held in the selected lateral position even when subject to cyclic mechanical loading by opening and closing of the door leaf.

The invention claimed is:

1. A pivot hinge having an extendable and retractable pivot pin for pivotally connecting a pivotal door leaf with a structural element, the door leaf having an upper edge, a lower edge, an inner side edge, and an outer side edge, and the pivot pin defining a vertical pivot axis, wherein the pivot hinge further comprises:

a casing configured to be mounted to the door leaf at a corner region between the inner side edge and the upper edge of the door leaf, a slidable base member that is movably mounted within the casing such that sliding of the base member adjusts a lateral position of the pivot pin relative to the door leaf, wherein the slidable base member includes a block which defines a vertical passage therein and has sliding faces that are in sliding engagement with the casing, and wherein the pivot pin is movable in the vertical passage of the block, a base adjustment member configured such that operating the base adjustment member causes the slidable base member to slide in the casing in a direction parallel to the upper edge of the door leaf, a lever assembly adapted to move the pivot pin between a retracted position and an extended position, wherein the lever assembly is located within the casing and supported by the slidable base member, the lever assembly comprising:

a lever member having a first end engaging the pivot pin, a fulcrum, and a second end, a lever adjustment member being in engagement with the second end of the lever member such that operating the lever adjustment member causes the lever member to pivot about the fulcrum, which in turn causes movement of the pivot pin between the retracted and extended positions, wherein both the base adjustment member and the lever adjustment member are each operable from the inner side edge of the door leaf.

2. The pivot hinge according to claim 1, wherein the casing comprises an inner side plate to be mounted along the inner side edge of the door leaf and a top plate to be mounted along the upper edge of the door leaf.

3. The pivot hinge according to claim 2, wherein the block of the slidable base member is slidably received with a portion thereof in an elongated recess in the top plate of the casing.

4. The pivot hinge according to claim 1, wherein the base adjustment member comprises a fastener embodied with a head which is rotatably retained in the inner side plate of the casing, which fastener has a threaded shank which extends from the head and which is screwed into a threaded bore of the block of the slidable base member, so that rotation of the fastener pushes the block of the slidable base member away from the inner side or pulls the block of the slidable base member towards the inner side plate.

5. The pivot hinge according to claim 4, wherein the lever adjustment member engages on a connection block with which the second end of the lever member is coupled, and wherein a linear movement of the connection block in a direction parallel to a top plate of the casing leads to a rotation of the lever member about the fulcrum, which in turn leads to a linear movement of the pivot pin in the vertical direction.

6. The pivot hinge according to any one or more of claim 1, wherein the lever adjustment member comprises a fastener embodied with a head which is rotatably retained in a portion of the slidable base member, which a portion is secured to the block, and with a threaded shank which extends from the head, wherein a connection block is at one end thereof provided with a threaded bore into which the shank of the fastener is screwed wherein the fastener of the lever adjustment member is operable through an opening in the inner side plate of the casing, so that a rotation of the fastener causes a linear movement of the connecting block.

7. The pivot hinge according to claim 1, wherein the casing is provided with inner ribs to slidably support the block of the slidable base member.

8. The pivot hinge according to claim 1, wherein the lever adjustment member is located on an opposite side of the pivot pin relative to the lever adjustment member.

9. A pivotal door leaf provided with a pivot hinge according claim 1, wherein the casing of the pivot hinge is mounted to the upper edge of the door leaf in a corner region between an inner side edge and an upper edge of the pivotal door leaf.

10. A pivot hinge having an extendable and retractable pivot pin for pivotally connecting a pivotal door leaf with a structural element, the door leaf having an upper edge, a lower edge, an inner side edge, and an outer side edge, and the pivot pin defining a vertical pivot axis, wherein the pivot hinge further comprises:

a casing configured to be mounted with a top plate thereof along the upper edge of the door leaf or along a corresponding edge of the structural element, wherein the top plate has an elongated opening through which the pivot pin passes, a slidable base member that is movably mounted within the casing such that sliding of the base member adjusts a lateral position of the pivot pin relative to the door leaf, wherein the slidable base member includes a block which defines a vertical passage therein and has sliding faces that are in sliding engagement with the casing, and wherein the pivot pin is vertically movable in the vertical passage of the block, a base adjustment member configured such that operating the base adjustment member causes the slidable base member to slide in the casing, a lever assembly adapted to move the pivot pin between a retracted position and an extended position, wherein the lever assembly is located within the casing and supported by the slidable base member, the lever assembly comprising:

a lever member having a first end engaging the pivot pin, a fulcrum, and a second end, a lever adjustment member being in engagement with the second end of the lever member such that operating the lever adjustment member causes the lever member to pivot about the fulcrum, which in turn causes movement of the pivot pin between the retracted and extended positions, wherein both the base adjustment member and the lever adjustment member are each operable from the top plate of the casing, at opposite sides relative to the opening therein for the pivot pin, wherein the base adjustment member comprises an adjustment shaft that is rotatably mounted in the casing, perpendicular to the top plate of the casing, which adjustment shaft is operable from the top plate of the casing, and wherein the pivot hinge further comprises a rotatable drive shaft parallel to the top plate of the casing, which drive shaft is journalled in the casing and has an end connected to the adjustment shaft via a gear transmission, and wherein the drive shaft has an opposed end with a thread screwed into a treaded bore of the block of the slidable base member so that rotation of the adjustment shaft causes adjustment of the lateral position of the block and the pivot pin.

11. The pivot hinge according to claim 10, wherein the lever adjustment member comprises a fastener that is rotatably mounted in the slidable base member, perpendicular to the top plate of the casing, which fastener is operable from the top plate of the casing and is coupled with the second end of the lever member via a nut member that is movable up and down by rotation of the fastener causing the lever member to pivot about the fulcrum, which in turn leads to a linear movement of the pivot pin in the vertical direction.

12. A structural element and a pivotal door leaf connected to the structural element via a pivot hinge according claim 10, wherein the casing is mounted to either an upper edge of the door leaf or to the structural element above the upper edge of the door leaf.

13. The pivot hinge according to claim 10, wherein the gear transmission is a bevel gears transmission.

14. The pivot hinge according to claim 10, wherein the adjustment shaft has a head end journalled in the top plate.

* * * * *